US006993684B2

(12) United States Patent
Ookawa et al.

(10) Patent No.: US 6,993,684 B2
(45) Date of Patent: Jan. 31, 2006

(54) RING CONTROL NODE

(75) Inventors: Naokatsu Ookawa, Yokohama (JP); Takuya Okamoto, Yokohama (JP); Takashi Honda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 592 days.

(21) Appl. No.: 10/164,509

(22) Filed: Jun. 6, 2002

(65) Prior Publication Data

US 2003/0145254 A1 Jul. 31, 2003

(30) Foreign Application Priority Data

Jan. 29, 2002 (JP) ............................ 2002-020243

(51) Int. Cl.
*G06F 11/00* (2006.01)

(52) U.S. Cl. ......................... 714/43; 370/224; 709/251

(58) Field of Classification Search .................. 714/43, 714/4; 370/224, 222; 709/251

See application file for complete search history.

(56) References Cited

U.S. PATENT DOCUMENTS

| | | | | |
|---|---|---|---|---|
| 5,146,452 | A * | 9/1992 | Pekarske | 370/228 |
| 5,307,353 | A * | 4/1994 | Yamashita et al. | 714/4 |
| 5,442,620 | A * | 8/1995 | Kremer | 370/224 |
| 6,816,461 | B1 * | 11/2004 | Scrandis et al. | 370/242 |
| 6,820,210 | B1 * | 11/2004 | Daruwalla et al. | 714/4 |
| 2002/0144190 | A1 * | 10/2002 | Bruckman | 714/43 |
| 2003/0056153 | A1 * | 3/2003 | Beer et al. | 714/43 |

* cited by examiner

*Primary Examiner*—Scott Baderman
*Assistant Examiner*—Joshua Lohn
(74) *Attorney, Agent, or Firm*—Katten Muchin Rosenman LLP

(57) ABSTRACT

The present invention relates to a ring system, in particular to a ring control node which increases the upper limit of the number of nodes that can be arranged on one ring by a BLSR control and conforms to an increase in line capacity and the scale of a system. The ring control node made of a plurality of nodes for performing ring control, and spans for connecting the plurality of nodes in a ring shape, and each of the nodes detects a fault occurring in a span between itself and another node adjacent thereto, and transmits the fault information to the other node using, as a destination, a span ID assigned to the span.

7 Claims, 11 Drawing Sheets

| | a | b | c | d | e | f | g | h |
|---|---|---|---|---|---|---|---|---|
| E SIDE SPAN ID | 1 | 2 | 3 | 4 | 5 | 6 | 7 | 8 |
| W SIDE SPAN ID | 2 | 3 | 4 | 5 | 6 | 7 | 8 | 1 |

Fig.11

| | SWITCHING REQUEST | SPAN ID | PATH | SWITCHING STATUS |
|---|---|---|---|---|
| he1 | NR | 1 | S | Idle |
| hw1 | NR | 2 | S | Idle |
| ae1 | NR | 2 | S | Idle |
| aw1 | NR | 3 | S | Idle |
| be1 | NR | 3 | S | Idle |
| bw1 | NR | 4 | S | Idle |
| ce1 | NR | 4 | S | Idle |
| cw1 | NR | 5 | S | Idle |
| be2 | SF-R | 3 | S | Idle |
| bw2 | SF-R | 3 | L | Idle |
| ae2 | SF-R | 3 | L | Idle |
| aw2 | RR-R | 3 | S | Idle |
| ae3 | SF-R | 3 | L | Br&Sw |
| aw3 | RR-R | 3 | S | Br&Sw |
| be3 | SF-R | 3 | S | Br&Sw |
| bw3 | SF-R | 3 | L | Br&Sw |

RING CONTROL NODE

BACKGROUND OF THE INVENTION

1. Field of the Invention

The present invention relates to a ring system and, in particular, to a ring control node which increases the upper limit of the number of nodes that can be arranged on one ring in a BLSR (Bi-directional Line Switched Ring) system utilizing optical transmission devices (nodes), and conforms to the increase in line capacity and the scale of systems accompanying recent technical innovations.

2. Description of the Related Art

The BLSR control method in a ring system is based on the North American standard SONET (Synchronous Optical Network: standard GR-1230-CORE). In a duplex ring line within a BLSR ring system, only a single directional ring is normally used to perform data transfer from a transmitting node to a receiving node. On the other hand, if a fault occurs within the line, data continues to be transferred by switching to the undamaged ring in the opposite direction.

FIGS. 1A and 1B show examples of a ring system using the prior art BLSR method. FIG. 1A shows an example of how the system operates under normal operating conditions, and FIG. B shows an example of how the system operates when a fault has occurred.

During normal operation as shown in FIG. 1A, data sent from the transmitting node 11 is received by the receiving node 14 through, in this example, a counter-clockwise route via node 16 and node 15. When a line fault occurs between nodes as shown in FIG. 1B, line switching is executed based on the APS (Auto Protection Switch) protocol for BLSR in adjacent nodes 11 and 16 enclosing the span (the space connecting nodes) which includes the line where the fault has occurred. In the present example, the node 11 located on the data transmission side of the above-mentioned span bridges the transmission route to a clockwise route, while the node 16 located on the data reception side switches and sends the data received by the clockwise route to the original counter-clockwise route.

FIG. 2 shows an example of a K1/K2 byte format in a SONET main signal line overhead (SOH). The K1/K2 byte format is used in route switching controls and alarm displays, and is based on the APS protocol for BLSR.

In FIG. 2, the four bits 5 to 8 of a K1 byte are assigned to the receiving node ID, and the four bits 1 to 4 of a K2 byte are assigned to the transmitting node ID. Consequently, 16 nodes can be specified for each of the receiving node and transmitting node. Also, the switching request type is set in bits 1 to 4 of a K1 byte; for example, if "1011" is set, this specifies a Signal Fail-Ring Switch (SF-R) request.

If the route bit 5 of a K2 byte is set to "0", this sets the short path to the receiving node via the ring direction whose route is shortest, and if it is set to "1", this sets the long path via the ring direction whose route is longest. Further, the node switching status type is set in the three bits 6 to 8 of byte K2; for example, if "010" is set, a bridge and switch (Br&Sw) state is specified.

FIG. 3 shows an example of prior art node ID allocation based on APS protocol for BLSR.

As shown in FIG. 3, node IDS "1" to "8" are assigned to each of the node 21 to 28. Each of the nodes 21 to 28 maintains a topology map so as to recognize all of the other nodes 21 to 28. In the present example, a fault has occurred in the clockwise ring line in the span between node 21 and node 22. In this case, in the adjacent nodes 21 and 22 enclosing the span, firstly the node 22 on the data receiving side detects the occurrence of a fault. Node 22 refers to the topology map and recognizes that the other adjacent node enclosing the span is node 21, sets the receiving node ID "1", the transmitting node ID "2" and the Signal Fail-Ring Switch (SF-R) request in the switching request in the above-mentioned K1/K2 bytes, and outputs a switching request to both the counter-clockwise (E to W) short path (path bit "0") and the clockwise (W to E) long path (path bit "1").

If the receiving node 21 receives the same Signal Fail-Ring Switch (SF-R) request via both the long path and the short path, the switching request and fault location are verified and the path switching process is executed therefrom. Thereafter, the communication route for when a fault occurs is set as shown in FIG. 1B. Note that intermediate nodes 3 to 28 other than the receiving node 21 support fault recovery by pass-through operations.

Using the BLSR control method in this way, when operating normally each of the duplex ring lines can be used for separate data transmission, and since a so-called reserve type or standby type redundant structure is unnecessary, a ring system with high line usage efficiency can be constructed. In recent years, in optical line networks, with increases in line capacities and the scale of network structures accompanying rapid accelerating technical innovation, the demand for BLSR control systems is increasing and their application in large scale ring systems is being eagerly expected.

However, in the prior art BLSR ring system there are the following problems. The first is that, because the transmitting node ID and the receiving node ID are each specified by 4 bits (#0 to 15) in the K1/K2 bytes, it has had the limitation that only a maximum of 16 nodes can be installed on a single ring. As a result, in the prior art, where a network ring of more than 16 nodes has been constructed, an interconnection system (GR1230) or the like between common rings, known as ring interconnection, has been used.

In such a case, a BLSR control used within one ring can be troublesome, and there is the problem that, since it becomes necessary to introduce a new device to interconnect each of the rings, the network equipment and network management costs increase significantly. As a result, it is impossible to capitalize on the advantages of improving the line usage efficiency of the BLSR structure and to satisfy the customers' strong demand to be able to support a wide area with one ring.

Secondly, if the scale of a network is enlarged and the number of nodes installed within one ring is increased, the time taken from detection of a fault till execution of the path switching operation increases in proportion to the number of nodes. As a result, a new problem occurs in that fault recovery cannot be achieved within a suitable time frame. In this case, it is necessary to realize an increase in the throughput speed of the path switching request signal in the increased intermediate nodes other than the receiving node.

Thirdly, in the usage of a topology map by way of BLSR control, there is the possibility of the following problem occurring under certain conditions.

FIGS. 4*a* and 4B show an example of a case where a mismatch occurs in a topology map.

In the example given in FIG. 4A, the topology map of node 32 starts from its own node ID "2" and is erroneously set in the order "2341". In this case, it is possible for node 32 to detect the error in its own topology map by means of the receiving signal (#1/S) via the short path from node 31 (ID1), as long as the ring is operating correctly. In this manner it is possible for only the receiving side node 32 to detect a mismatch in its own node ID, then normally the node 32 which has detected the error outputs a mismatch alarm or the like, and the operator performs a topology mismatch recovery operation (correcting it to "2341").

Next, a worst case scenario wherein the mismatch state in FIG. 4A occurs simultaneously with a line fault will be considered. In such a case, if a fault (indicated by an "x") occurs in the clockwise ring line as shown in FIG. 4B, node 32 refers to the topology map "2341" without detecting that there is a mismatch, and transmits a path switching request (#4/L) via the same clockwise long to the receiving node 4. Similarly, it transmits a path switching request (#2/S) via the counter-clockwise short path.

In this case, because node 31 directly receives the path switching request via the short path from the adjacent node 32 (ID2) bordering the faulty span, it thereafter waits to receive the same path switching request via the long path. On the other hand, since node 34 (ID4) receives the path switching request via the long path, it thereafter waits to receive the same path switching request via the short path. As a result, the path switching conditions are never realized in either of the node 31 or node 34, the ring system remains in a receiving standby state, and the mismatch alarm is not generated, therefore this causes major problems.

SUMMARY OF THE INVENTION

In light of the above problems, it is an object of the present invention to remove the prior art limitation on the number of nodes, wherein the maximum number of nodes which could be installed on one ring was 16, and to provide a ring control node that capitalizes on the advantages of the increase in line usage efficiency of the BLSR structure and can support a wide area with one ring.

Also, it is an object of the present invention to provide a BLSR ring system and nodes therefor that, when the scale of a ring system is expanded and the number of nodes installed within one ring is increased, makes fault recovery possible, within a suitable time frame, by realizing a speed increase of the throughput of path switching request signals in an increased number of intermediate nodes.

Further, it is an object of the present invention to provide a ring control node that, when a topology map mismatch occurs in a given node within a ring, makes possible reliable and rapid topology map repair, by providing a topology map structure which makes it possible to detect the such errors.

Further still, it is an object of the present invention to provide a ring control node that can utilize as much as possible and without changes a format based on the APS protocol for BLSR, and thereby satisfy the demand for consistency with existing BLSR ring systems.

According to the present invention, a ring control node is provided comprising a plurality of nodes for performing ring control, and spans for connecting in a ring shape the plurality of nodes, wherein each of the plurality of nodes detects a fault occurring in a span between itself and a node adjacent thereto, and transmits fault information to the other node using as a destination a span ID assigned to said span.

Each of the above nodes forms a topology map of the entire ring in which a node ID assigned to a node on either one of an adjacent east side and west side enclosing one of the above spans corresponds to a span ID of said span. Each node determines a destination of the fault information by means of the span ID, and performs a path through operation on the fault information when the destination is that of a node other than itself.

Also, adjacent nodes enclosing the above span detect a nonconformity in a topology map by means of the span ID of the span common to both of the nodes. The ring control is a BLSR control, and substitutes the span ID for the transmitting node ID and the receiving node ID of the BLSR control.

BRIEF DESCRIPTION OF THE DRAWINGS

The present invention will be more clearly understood from the description as set forth below with reference to the accompanying drawings.

FIG. 11 shows a list of K1/K2 byte settings used in FIG. 10.

DESCRIPTION OF THE PREFERRED EMBODIMENTS

Figure 5:
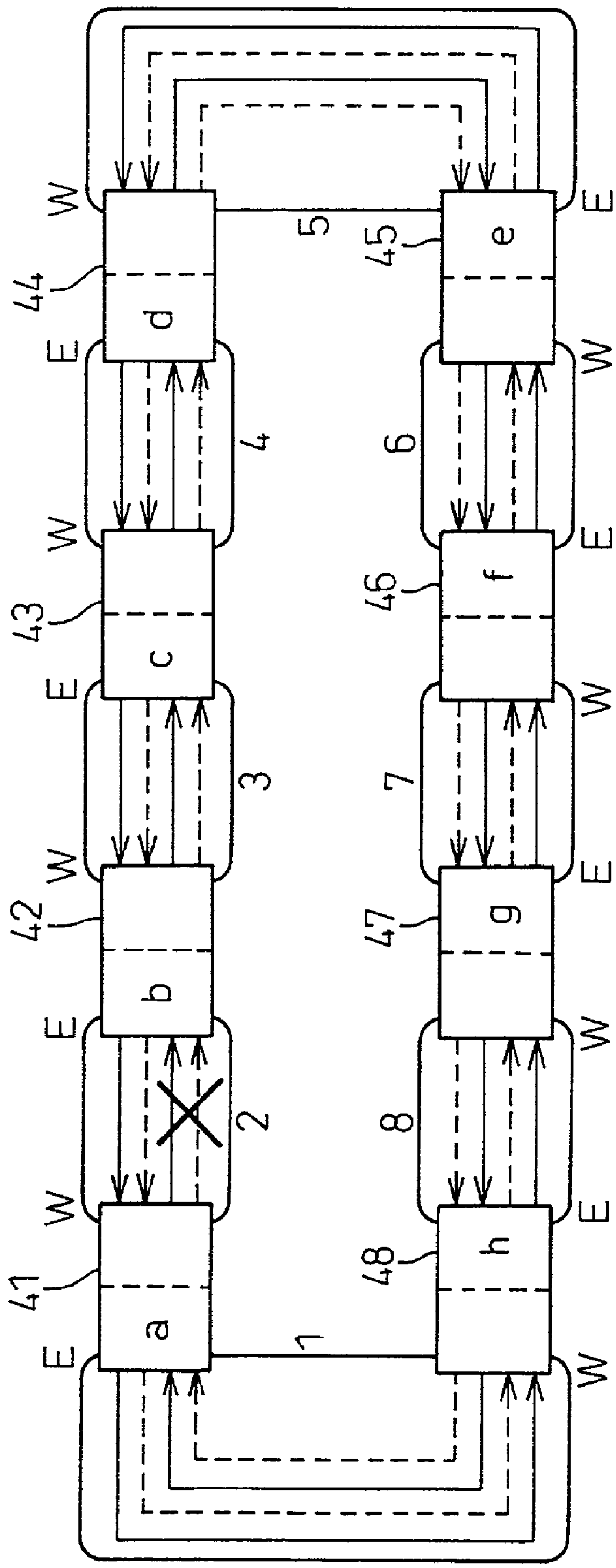
FIG. 5 shows an example of a BLSR ring system to which span IDs of the present invention are assigned.

FIG. 5 shows an example of a BLSR ring system which assigns span IDs according to the present invention.

In the present invention, in place of node IDs set for each of prior art nodes, span IDs are assigned for each of spans between adjacent nodes. In the example of FIG. 5, the span ID between node 41 and node 48 is "1", and the span ID between node 42 and node 41 is "2".

The span itself is merely the space connecting nodes, and it is possible, in the case of a ring structure, to create a one-to-one correspondence between spans and nodes. For example, in the example of FIG. 5 the number of spans and the number of nodes are both eight. Further, in the present example it is specified such that "the span ID of a span on the ring is assigned to the node of the east side of the corresponding span". For example, node 41 having the pseudo-node ID "a" corresponds to the span ID "1", and similarly node 42 having the node ID "b" corresponds to the span ID "2".

Figures 6A, 6B:
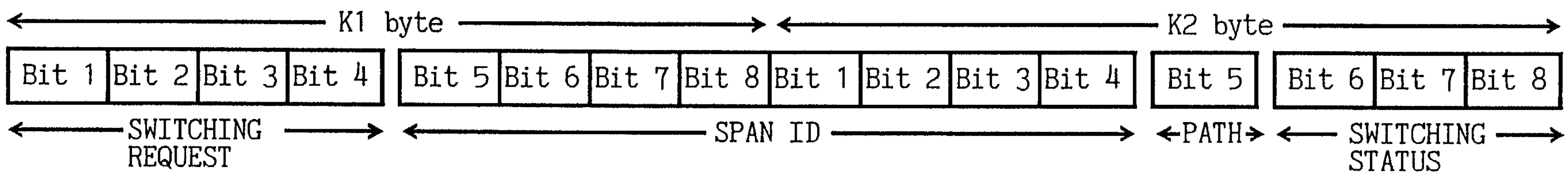
FIG. 6A shows an example of the K1/K2 byte format according to the present invention.
FIG. 6B shows an example of the topology map according to the present invention.

FIGS. 6A and 6B show examples of a K1/K2 byte format and a topology map according to the present invention.

As shown in FIG. 6A, a total of 8 bits, being bits 5 to 8 of K1 byte and bits 1 to 4 of K2 byte, are allocated to the span ID. Consequently, although 256 spans can be identified in the span ID, because an ID of all "0" is specified for use as the default, in actuality only the 255 IDs from 1 to 255 can be used for span IDs.

Figure 1A:
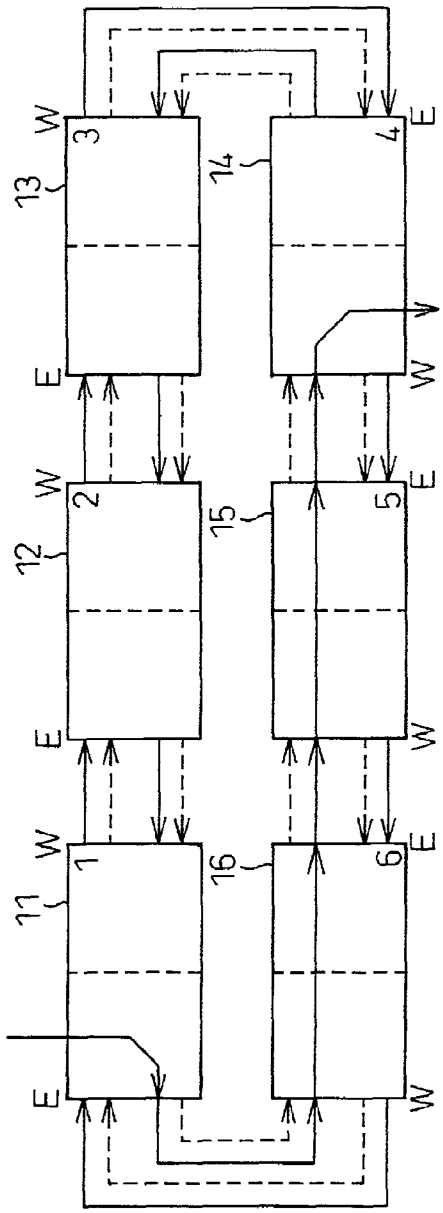
FIG. 1A shows an operation example (1) of a prior art BLSR ring system.
Figure 1B:
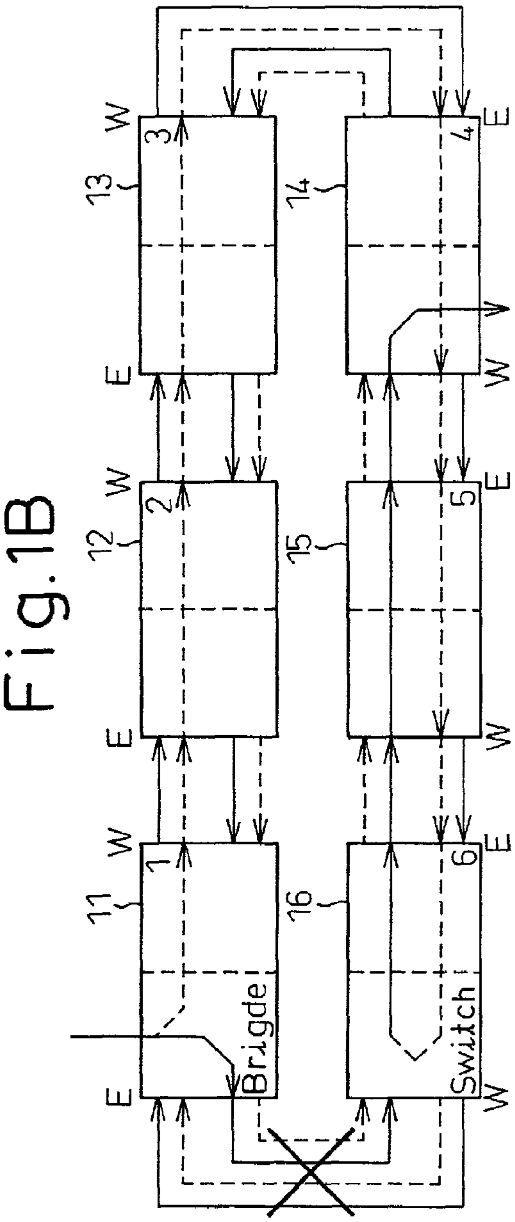
FIG. 1B shows an operation example (2) of a prior art BLSR ring system.
Figure 2:
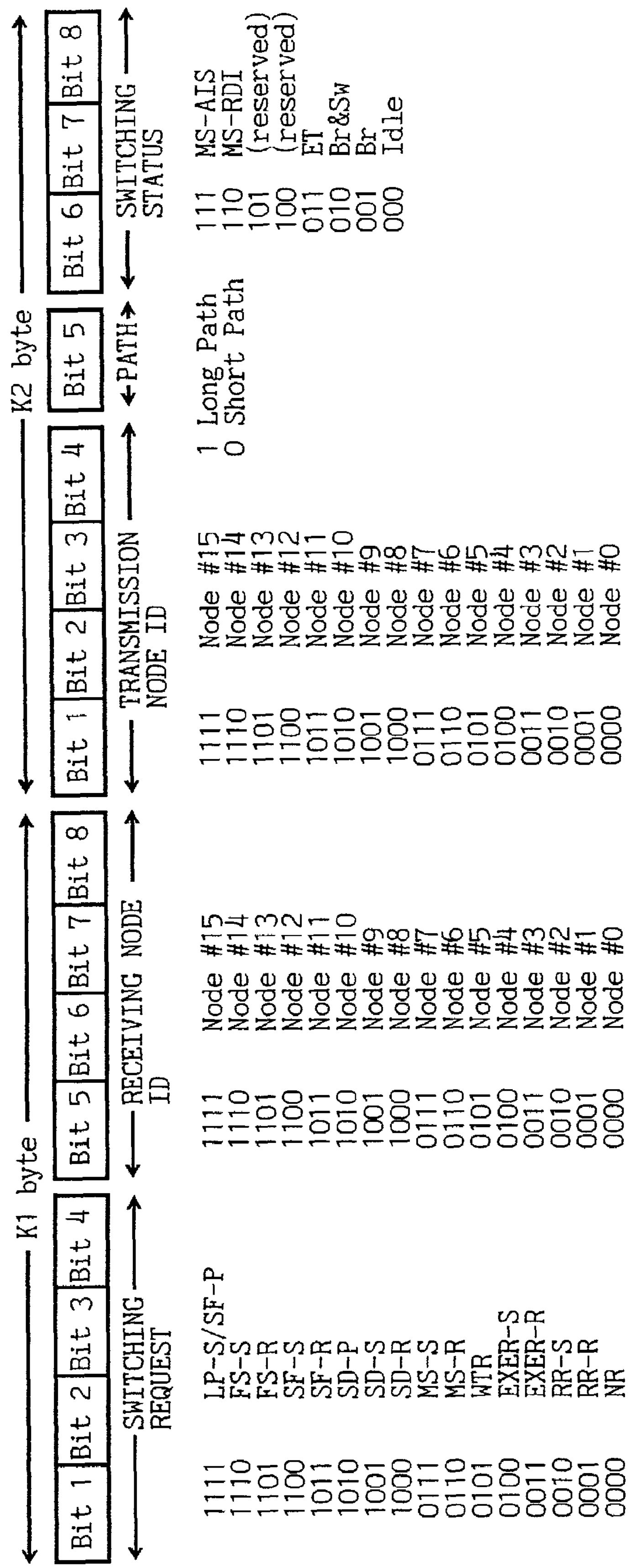
FIG. 2 shows an existing K1/K2 byte format.
Figure 3:
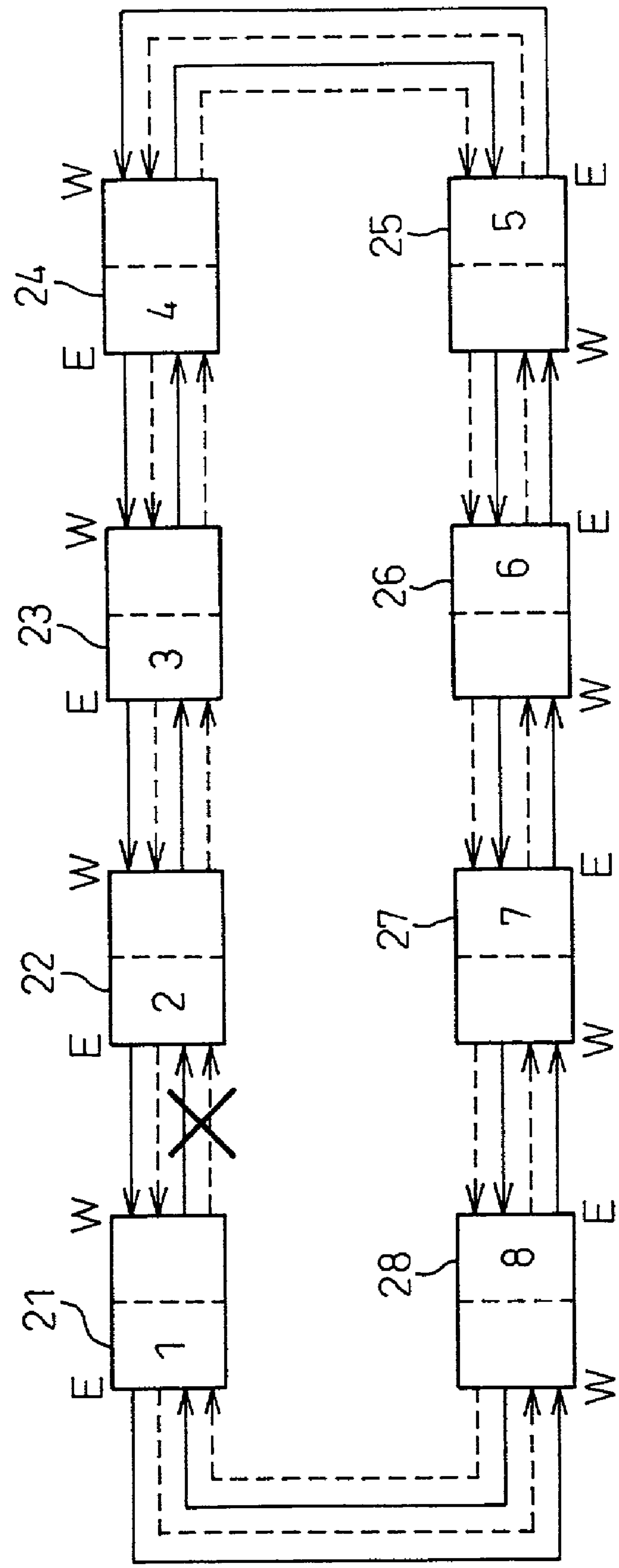
FIG. 3 shows an example of a BLSR ring system to which prior art node IDs are assigned.

Comparing FIG. 6A to the existing K1/K2 byte format shown in FIG. 2, apart from a span ID being substituted for the existing receiving node ID and transmitting node ID, it is the same as the existing format. However, in the content of a path switching request or the like, it is necessary to substitute span correspondence for node correspondence. As describe above, since there is a one-to-one correspondence between spans and nodes, the number of nodes which can be identified using span IDs are greatly expanded to a maximum of 255 nodes compared to the 16 nodes of the prior art.

FIG. 6B shows an example of a topology map using the span IDs of the present invention. As described above, if it is specified that the span ID of a span on the ring is assigned to the node of the east side of the corresponding span, the east side of node 41 (ID "a") is span ID "1" and the west side is span ID "2", and the east side of node 42 (ID "b") is span ID "2", while the west side is span ID "3". In this case, the east side span ID corresponds to the pseudo-ID ("a" and "b") of the relevant node.

Conversely to the above, even if it is specified such "that the physical node ID assigned to each node is assigned to the span ID of the span on the east side of the corresponding node", an identical topology map to that shown in FIG. 6B is created. Note that in the above two examples, although each node is made to correspond to the span ID on the east side of the node, it is also possible to make the span ID on the west side correspond to each node.

When a topology map formation request signal is received, each node 41 to 48 provides the span ID information set on its east side (or west side), whereby the topology map is formed from the span IDS. Each node on the ring recognizes the span ID on either side and can recognize the positional relationship of span IDs on the ring.

Further, if the received span ID set in the K1/K2 bytes and the topology map of the node which has received this conform, the switching request can identify which node the signal was sent from and which node it is being sent to. Also, comparing the topology map of the present invention to the prior art topology map, since the amount of information necessary for forming a topology map by means of span IDs does not increase (the only change is that of node ID to span ID), the same topology map formation technology as that for the prior art can be applied.

Figure 7:
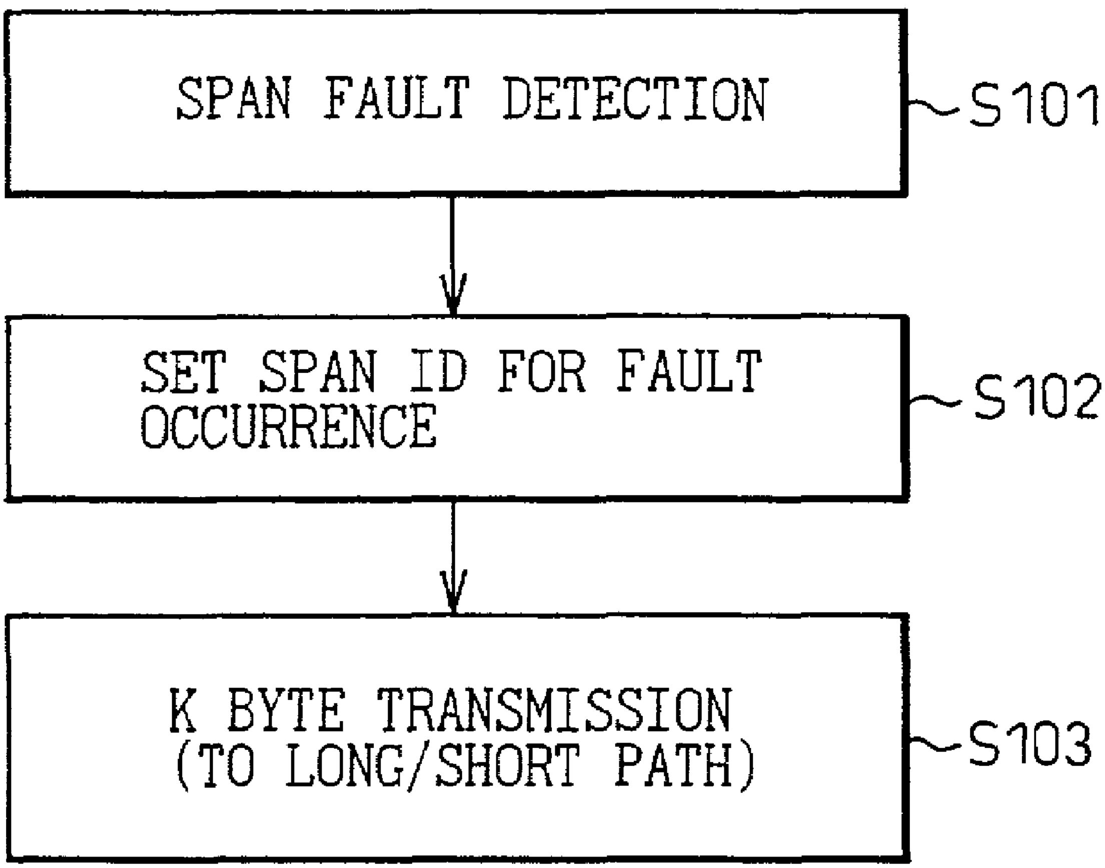
FIG. 7 shows an example of the K1/K2 byte transmission flow using span IDs.
Figure 8:
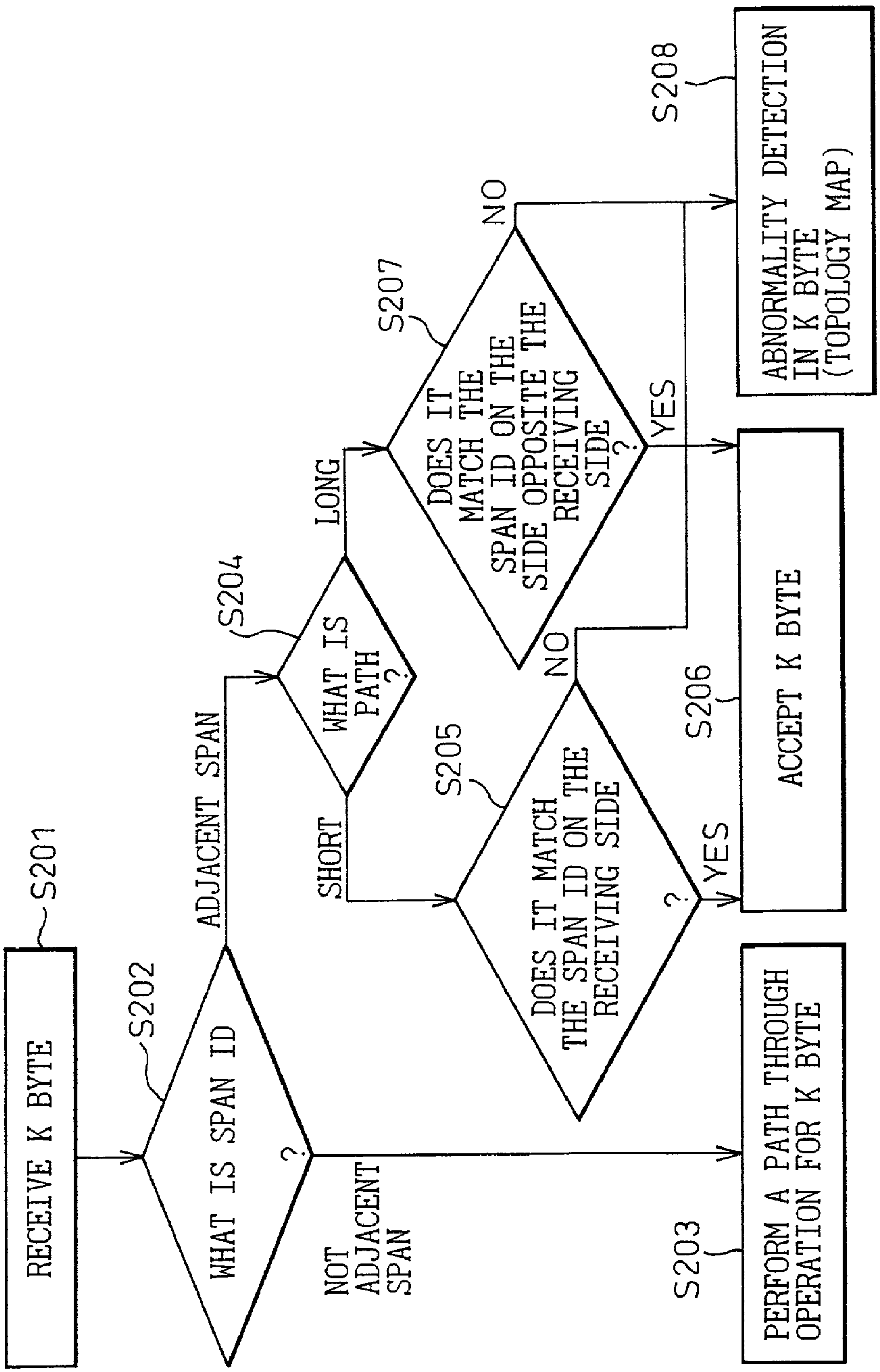
FIG. 8 shows an example of the K1/K2 byte reception flow using span IDs.

FIG. 7 shows an example of the transmission flow of the K1/K2 bytes using the span IDs for adjacent nodes where a fault has occurred, while FIG. 8 shows the reception flow thereof. Here, an example where a fault has occurred in the span whose ID is shown as "2" in FIG. 5.

Firstly, the receiving side node 42 detects the span fault (S101), and the span ID "2" of the span where the fault has occurred is set in the span ID field of the K1/K2 bytes (S102). Then a path switching request is set due to the span fault and transmitted by both the short path and the long path (S103).

Node 41 on the transmitting side of the faulty span directly receives the signal via the short path (S201). Then, it identifies whether the received span ID "2" corresponds to either of the span IDs "1" and "2" of the adjacent to itself by referring to its own topology map (S202). Further, it checks the path of the received K1/K2 bytes (S204), and since in this case it corresponds to the span ID "2" on the received west side, which is the short path (S205), it recognizes these as correct K1/K2 bytes and receives signal into the node (S206).

On the other hand, it receives the same K1/K2 bytes via the long path (S201), and checks the reception path by means of conformity with the span ID "2" on the west side, (S202 to S204). Since in this case it is the long path (S204), and corresponds to the west side span ID "2" opposite to the received east side (S207), it recognizes these as correct K1/K2 bytes and receives a signal into the node (S206).

Node 41 confirms the correspondence of the span IDs "2" received from both the short path and the long path, and executes the path switching command included in the received K1/K2 bytes. Also, the span ID "2" of the received K1/K2 bytes is checked by each of the intermediate nodes, and since the ID does not correspond to the span IDs adjacent to each of these nodes, for example span IDs "3" or "4" adjacent to node 43, they commence throughput immediately (S202 and S203).

In this manner the path through determination of the present invention is simply determining correspondence of span IDs, and determination of the path (short/long) in addition to determining the correspondence of the ID fields in the K1/K2 bytes, as in the prior art, is unnecessary. Therefore, the path through process is simplified and processing time reduced. As a result, even if the number of nodes within one ring is increased, it is still possible for all of the intermediate nodes in the entire ring to execute path switching within the desired switching time.

Next, an explanation will be given regarding a fault in the received K1/K2 bytes and a fault in the topology map (S208).

Figure 9A:
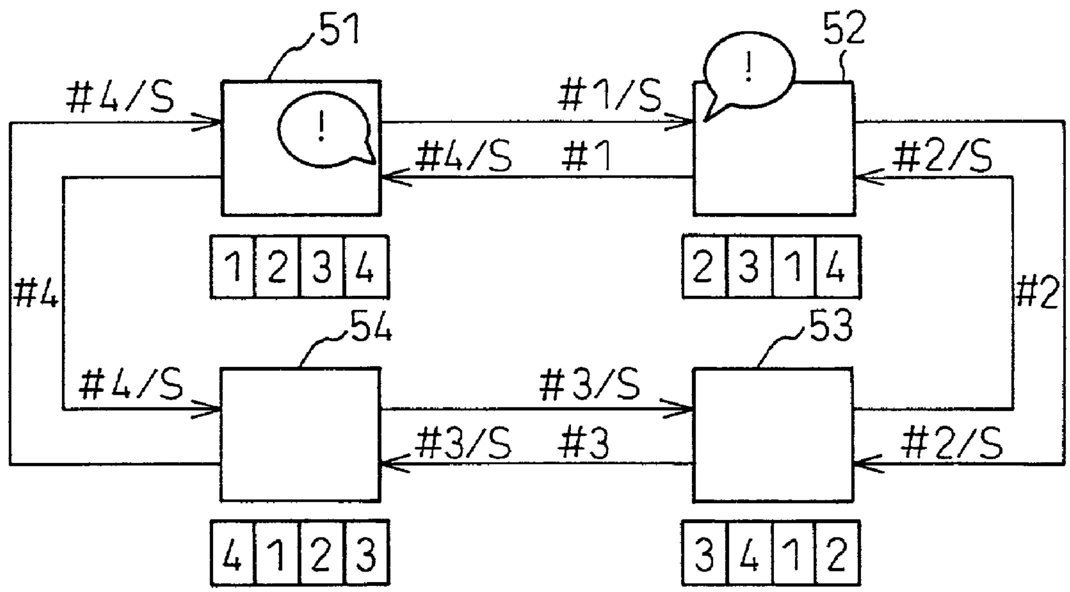
FIG. 9A shows an example (1) in which a mismatch has occurred in the topology map of the present invention.
Figure 9B:
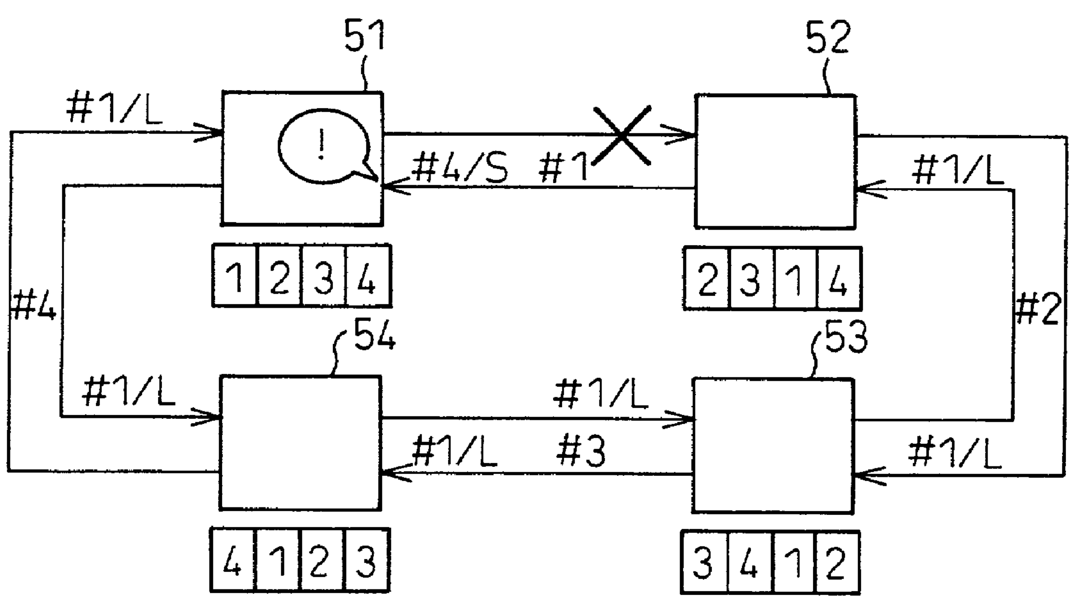
FIG. 9B shows an example (2) in which a mismatch has occurred in the topology map of the present invention.

FIGS. 9A and 9B show an example of a case where a mismatch has occurred in a topology map created by span IDs of the present invention. In the example of FIG. 9A, the topology map of node 52 is erroneously set to "2341" in the clockwise direction from its own node ID "2". In this case the ring is operating correctly, and the receiving side node 52 detects the mismatch in its own topology map by means of the signal (#1/S) received via the short path in the clockwise direction from the transmitting side node 51 adjacent to the span 1 (#1). In other words, the receiving side node 52 detects that the adjacent span ID on the east side is "#1", and outputs a mismatch alarm or the like, then the operator performs a topology map recovery operation (editing the topology map to "2341").

Note that in the present invention the receiving side node 51 in the counter-clockwise direction also detects a mismatch in its own topology map by means of the signal (#4/S) it receives via the short path from the transmitting side node 52 enclosing the span (#1), and outputs a mismatch alarm or the like. This is because the adjacent nodes 51 and 52 share the information of the span ID "#1" therebetween.

Figure 4A:
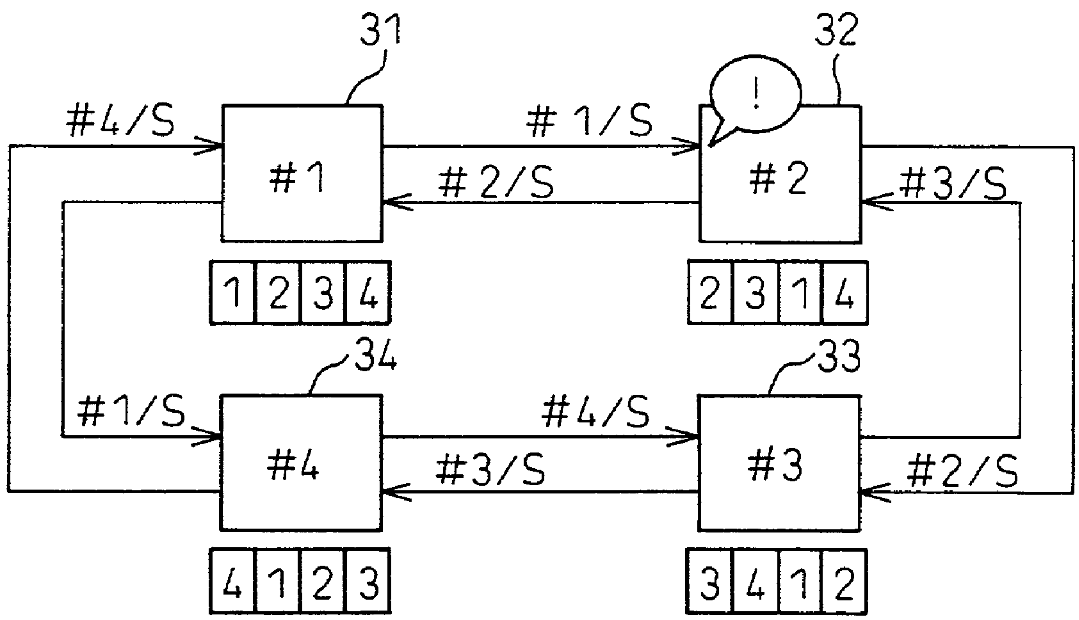
FIG. 4A shows an example (1) in which a mismatch has occurred in a topology map.
Figure 4B:
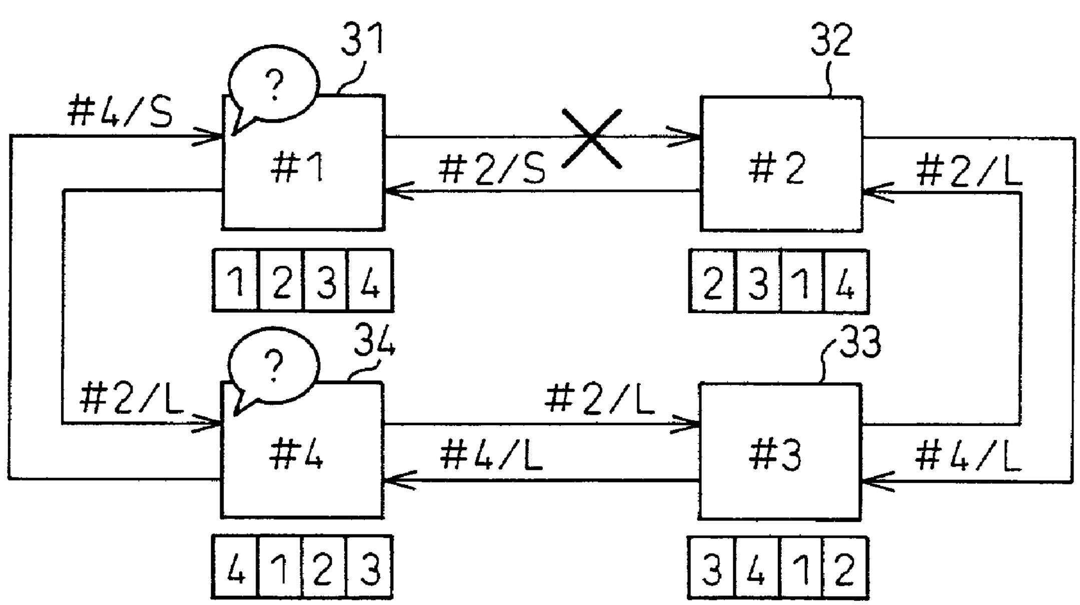
FIG. 4B shows an example (2) in which a mismatch has occurred in a topology map.

Accordingly, a state wherein topology map mismatch detection is not possible by means of a prior art node ID, as explained above with reference to FIG. 4B, does not occur. In other words, even in the worst case where the mismatch state of FIG. 9A occurs simultaneously with a line fault, the node 51 can detect a mismatch as before, as shown in FIG. 9B, and as a result, the node 51 detects the mismatch and outputs a mismatch alarm or the like. By this means, the operator can rapidly commence a recovery operation on the topology map.

Note that, although in the above example a case wherein the faulty span is identified directly from the span ID is described, it is also possible to refer to the topology map from the received span ID and firstly identify the transmitting node and the receiving node. In this case, BLSR control using transmitting nodes and receiving nodes identical to those of the prior art of FIG. 2 is possible. In the above example, the transmitting node 42 and receiving node 41 are identified from the span ID "2" directly received via the short path. In this manner, if the span ID is used, path switching by means of BLSR control can be executed in the same way as the prior art.

Figure 10:
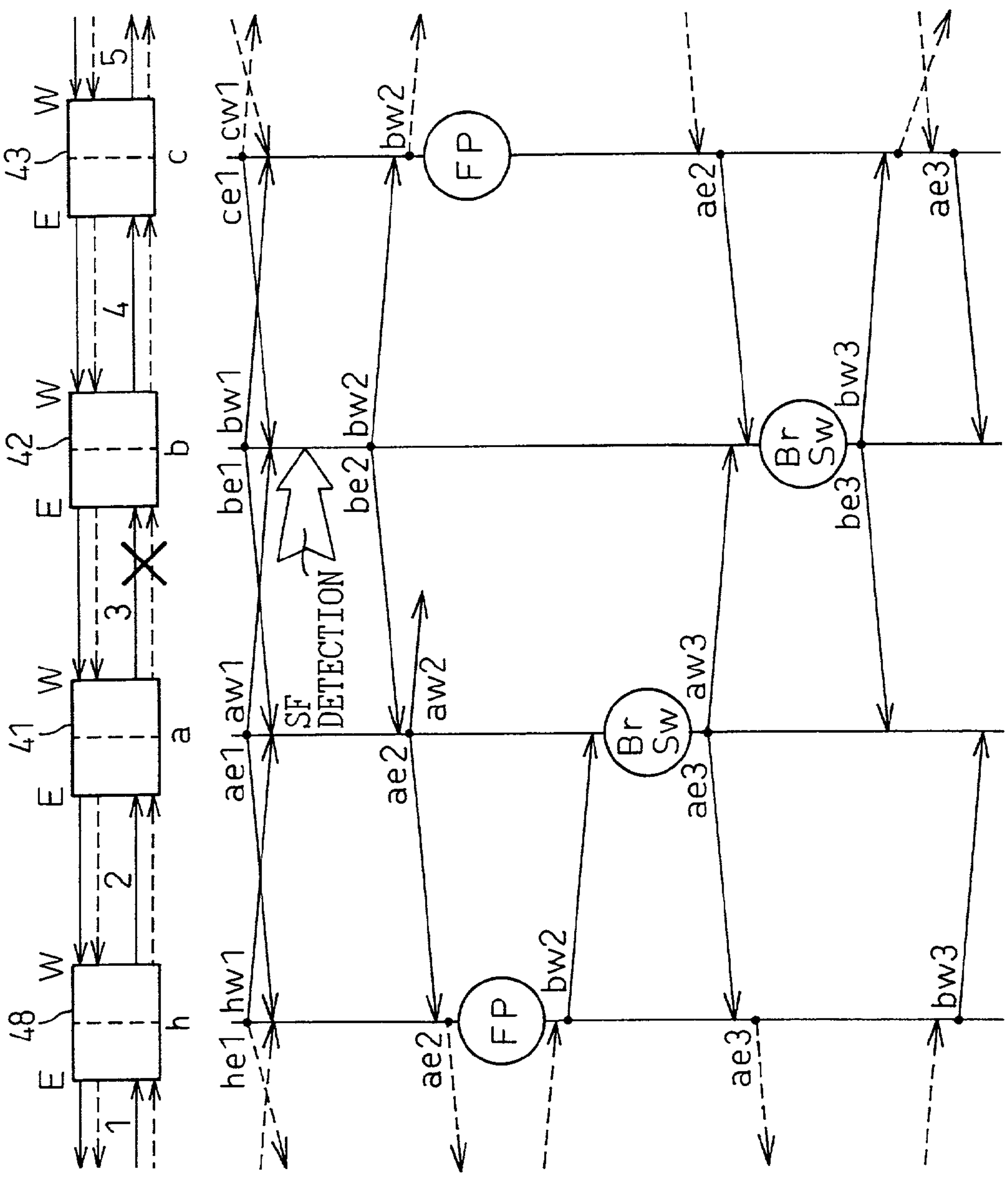
FIG. 10 shows an example of a path switching control sequence when a signal interruption fault has occurred.

FIG. 10 shows an example of the path switching control sequence when the signal failure (SF) fault of FIG. 5 has occurred. Also, FIG. 11 is a list of the path switching control signal (K1/K2 bytes) settings used in FIG. 10.

In FIG. 10, during normal operation when a fault has not occurred, each node transmits a NR (Not Request) showing no fault at regular intervals via the short path to each of their adjacent nodes (ae1-he1 and aw1-hw1, where e=east and w=west). Thereafter, a fault (indicated by an "x") in the line in the clockwise direction at span ID "3", and node 42 detects this as a signal failure (SF: Signal Fail). Node 42 transmits a signal failure ring switching request (SF-R: Signal Fail-Ring Switch) via the short path (be2) to the east side of span ID 3 and in the opposite direction to the west side via the long path (bw2).

Node 41 receives the signal failure ring switching request from the west side via the short path (be2), and recognizes that a fault has occurred at span ID "3" on the west side by referring to its own topology map. Its response is to transmit a receive signal possible response (RR-R: Reverse Request-Ring) via the short path (aw2) and in the opposite direction to the east side via the long path (ae2).

The other intermediate nodes 43 to 48 receive the signal failure ring switching request of the span ID "3" transmitted via the long path on the west side by node 42. Each of the intermediate nodes 43 to 48 refers to its topology map, recognizes that it is not the span ID adjacent to itself, and changes to a full path through state (FP: Full Path-through).

Thereafter, the signal failure ring switching request transmitted by node 42 via the long path (bw2) arrives at the east side of node 41. Node 41 recognizes that this has arrived via the long path (bw2), and that the received span ID "3", corresponds to the west side span ID "3" on the opposite side and therefore that this request is directed towards itself, and commences a switching operation. Thereby, node 41 changes to a bridge and switch state (Br&Sw: Bridge & Switch).

On the other hand, node 42 similarly receives the response transmitted by node 41 from the west side via the long path (ae2), confirms the correspondence with the response previously received via the short path (aw2), and commences a switching operation. Thereby, node 42 also changes to a bridge and switch state (Br&Sw).

As explained above, by utilizing the span IDs of the present invention, nodes which exceed 16 nodes on the same ring can be fully distinguished, therefore the number of nodes that can be installed in one ring utilizing BLSR can be increased to a maximum of 255 without expanding the existing K1/K2 bytes and without greatly changing the path switching control procedure by means of APS protocol for BLSR. Thereby, large scale BLSR networks can be constructed and, compared to networks formed by connecting a plurality of rings of the same number, installation costs can be greatly reduced and improvement of line usage efficiency is possible.

Also, according to the present invention, since the process flow in the intermediate nodes is simplified, the interval from the occurrence of a fault to fault recovery by means of path switching accompanying large scale BLSR networks can be shortened. Further, according to the present invention, due to the same span ID being shared by adjacent nodes, topology mismatch detection can be more accurate than in the prior art.

What is claimed is:

1. A ring control node comprising:

a plurality of nodes for performing ring control, and spans for connecting said plurality of nodes in a ring shape, wherein each of the plurality of nodes detects a fault occurring in a span between itself and another node adjacent thereto, and transmits fault information to said other node, using a span ID assigned to a pair of said span and either one of two nodes each connected to one end of said span.

2. The ring control node according to claim 1, wherein each of said nodes forms a topology map of the entire ring in which a node ID assigned to a node on either one of an adjacent east side and west side enclosing one of the above spans corresponds to a span ID of said span.

3. The ring control node according to claim 2, wherein each of said nodes determines a destination of said fault information by means of the span ID, and performs a path through operation on the fault information when the destination is that of a node other than itself.

4. The ring control node according to claim 3, wherein adjacent nodes enclosing said span detect a nonconformity in a topology map by means of the span ID of the span common to both of the nodes.

5. The ring control node according to claim 1, wherein the ring control is a BLSR control, and substitutes the span ID for the transmitting node ID and the receiving node ID of the BLSR control.

6. A ring control node comprising:

a plurality of nodes for performing ring control, and spans for connecting said plurality of nodes in a ring shape, wherein each of the plurality of nodes detects a fault occurring in a span between itself and another node adjacent thereto, and transmits fault information to said other node using as a destination a span ID assigned to said span, wherein adjacent nodes enclosing said span detect a nonconformity in a topology map by means of the span ID of the span common to both of the nodes.

7. A ring control node comprising:

a plurality of nodes for performing ring control, and spans for connecting said plurality of nodes in a ring shape, wherein each of the plurality of nodes detects a fault occurring in a span between itself and another node adjacent thereto, and transmits fault information to said other node using as a destination a span ID assigned to said span, wherein the ring control is a BLSR control, and substitutes the span ID for the transmitting node ID and the receiving node ID of the BLSR control.

* * * * *